June 28, 1955

A. H. McKINNEY 2,711,754

FLUID OPERATED CONTROL APPARATUS

Filed Jan. 25, 1950

INVENTOR.
ALFRED H. McKINNEY
BY
ATTORNEYS.

June 28, 1955 A. H. McKINNEY 2,711,754
FLUID OPERATED CONTROL APPARATUS
Filed Jan. 25, 1950 4 Sheets-Sheet 2

INVENTOR.
ALFRED H. McKINNEY
BY
ATTORNEYS.

June 28, 1955 — A. H. McKINNEY — 2,711,754
FLUID OPERATED CONTROL APPARATUS
Filed Jan. 25, 1950 — 4 Sheets-Sheet 4

INVENTOR.
ALFRED H. McKINNEY
BY
ATTORNEYS.

United States Patent Office 2,711,754
Patented June 28, 1955

2,711,754
FLUID OPERATED CONTROL APPARATUS

Alfred H. McKinney, Chester, Pa.

Application January 25, 1950, Serial No. 140,490

10 Claims. (Cl. 137—486)

This invention relates to fluid operated control apparatus and to elements thereof which may be used for measurement or transmission without control characteristics. In particular, the apparatus is of the pneumatic type utilizing compressed air for its operation.

Control apparatus, as presently constructed for full scale plants, is bulky, expensive, and does not lend itself to the making of temporary connections. It is, thus, unsuited for the laboratory experimentor who desires to test his process on a continuous scale using laboratory apparatus which is generally made up of glass parts connected with flexible tubing. The commercial control apparatus presently on the market requires a great amount of time for its connections to be made and, as already indicated, is both large and expensive so as to be unsuited to the requirements of the laboratory experiment.

One of the broad objects of the present invention is the provision of control apparatus including various parts thereof which may be used for other than control purposes, which apparatus is well adapted for use in conjunction with apparatus constructed on a laboratory scale and of a temporary nature. In brief, this end is achieved by a novel type of apparatus comprising an assembly of blocks of heat-resistant and chemical-resistant plastic material associated together with interposed diaphragms or gaskets with short internal connections provided between chambers and other elements formed in the blocks themselves and with passages controlled by the gasket or diaphragm elements. The resulting control apparatus is adapted to perform all of the functions of the apparatus presently available for full-size plants, but is, in comparison, very small in size and desirably may be transparent so that the laboratory experimentor has all of the visibility available which is afforded to him in the use of the glass apparatus with which he is familiar. Connections, furthermore, may be made through the use of flexible tubing which may be connected in conventional fashion to the apparatus subject to control or measurement. Furthermore, as will become more clearly apparent hereafter, the apparatus may be produced and sold at a cost which is only a small fraction of the cost of the control apparatus presently available.

While the improved apparatus is particularly useful for the purposes just indicated, it has many advantages due to its type of construction and to its compactness. It is not, therefore, limited merely to association with laboratory apparatus but various of the advantages which it has make it especially useful for control of semi-plants and full-scale plants.

As compared with conventional apparatus the present control apparatus involes small chambers, direct short connections, light moving parts, and other features which lead to very high speed response to changes in process variables. In view of the fact that the majority of its connections are internal, its association with the components of a plant is very easily effected. Furthermore, its construction is such that it will have a long life in any normal use and while its total life might be expected to be less than that of the large size commercial apparatus with numerous mechanical parts having elaborate bearings and the like, the fact that it is relatively very inexpensive and may be easily associated with the devices to be controlled makes it possible to discard the improved apparatus without bothering about attempting to repair it in case some of its parts wear out or become otherwise defective.

It may be here remarked that the inexpensive nature of the improved apparatus is, to a considerable extent, due to the fact that it is made up of parts which may be utilized in a relatively large number of controllers or other pieces of apparatus having widely divergent functions. In fact, as will appear hereafter, the same parts may be assembled in general in their same order but, by the use of properly punched inexpensive gaskets the connections of the apparatus of internal type, may be easily changed to modify its functional characteristics.

All of the moving parts of the improved apparatus are located in closed chambers with no necessity for the provision of stuffing boxes or other devices to prevent leakage. Transmission from the apparatus of measurements or of control forces is through the medium of transmission of pneumatic pressure. Accordingly, for a very large variety of process variables, measurements may be made utilizing nothing more than pressure gauges.

While the improved apparatus will be described with particular reference to the use of superatmospheric pressure supply for its operation, it will become apparent hereafter that with obvious changes in its parts it may be operated through the use of vacuum producing apparatus which may be more readily available in connection with certain processes which it is desired to control or in which it is desired to make measurements.

The moving parts of the present apparatus are essentially free of friction and require no close clearances. Operation is on the force balance principle. The apparatus is without any dead zone and this, together with other characteristics, make it possible to utilize a quite low pressure supply. Only a small air flow is required in the apparatus and, consequently, there are no substantial demands on the air supply.

In its simplest form as a controller the improved apparatus is of the type having a fixed throttling range and automatic adjustable reset. As will appear hereafter, however, it may be readily modified to provide other types of control without departure from its fundamental advantages.

One of the subsidiary elements of the improved apparatus is a flow control involving positive shut-off, and very low pressure drop when the control valve is wide open. The flow control, furthermore, may be made highly resistant to corrosion and is capable of handling not only clear liquids but heavy slurries, or the like. Furthermore, by reason of its construction its passages are clearly visible to the operator so that they may be readily checked for blockage or sedimentation of material.

As already indicated, the apparatus, in its more elaborate form, is particularly adapted to control. However, in simpler form, it is adapted to be used as a transmitter to measure various process variables. For this purpose there may be associated with it or, in some cases, provided as an integral part thereof, various transducers of types capable of transforming process variables of other types into pressures suitable for utilization in control or for the making of measurements.

The foregoing indicates the general objects of the invention. These and other objects particularly relating to details of construction and operation will become apparent from the following description read in conjunction with the accompanying drawings, in which.

Referring first to Figures 1 to 4, inclusive, these show one embodiment of the invention involving an assembly of elements which, as will appear hereafter, may be varied by the use of different arrangements of gaskets to provide various control and/or transmitting devices. The device specifically illustrated in these figures is a flow controller; variations to provide other types of controllers and/or transmitters will be described hereafter.

The device comprises a stacked assembly of blocks which are illustrated as discs and will be so referred to hereafter though they may obviously be of other outlines. These discs are illustrated at 2, 4, 6, 8, 10, 12, 14, 16, 18, 20 and 22 and may be formed of plastics such as Lucite or polystyrene, or other plastics resistant to chemical action. The plastics chosen may be adopted for particular uses. If, for example, corrosive, hot liquids are to be controlled, the discs subjected thereto (such as 14, 16, 18 and 20) may be formed of allyl resins capable of withstanding high temperatures and very corrosive liquids. On the other hand, less costly plastics may be used for those discs subject to only air or other control fluid. It is desirable that the plastics used be transparent so that the flow of liquids in the apparatus as well as its internal operation and condition may be readily observed. However, this is not an essential requirement and, accordingly, translucent or opaque plastics may be used for these discs, or they may be of metal, hard rubber, or other materials. As will be observed from the figures, the discs are provided with annular grooves at their upper faces arranged to receive annular flanges on the lower faces of the next higher discs. The discs are assembled with gaskets between them, these being indicated at 3, 5, 7, 9, 11, 13, 15, 17, 19 and 21. As will hereafter appear, these gaskets or diaphragms, in most instances, serve to provide both functions, i. e., they serve as gaskets to confine fluid or prevent its leakage and also serve as movable diaphragms for control of flow. These diaphragms or gaskets are flexible and are desirably made of plastics such as the vinyl chloride plastics commercially known under the trade name of "tygon." Rubber may be used if desired. The discs and diaphragms are clamped in stacked assembly by means of bolts, indicated at 23, passing through aligned openings indicated at 25. By proper dimensioning of the flanges and grooves of the discs, clearances between the disc faces are provided so that when the stack is tightly clamped predetermined compression is applied to the clamped portions of the gaskets or diaphragms.

There may now be described the details of the various discs and the nature of the passages and chambers provided.

Figure 1:
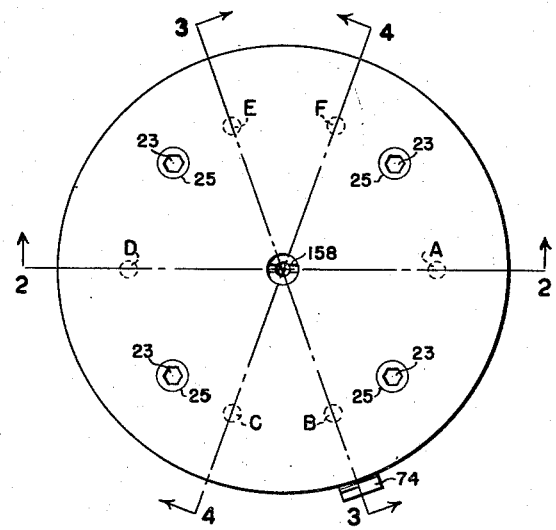
Figure 1 is a plan view showing in particular an apparatus provided in accordance with the invention for flow control.
Figure 2:
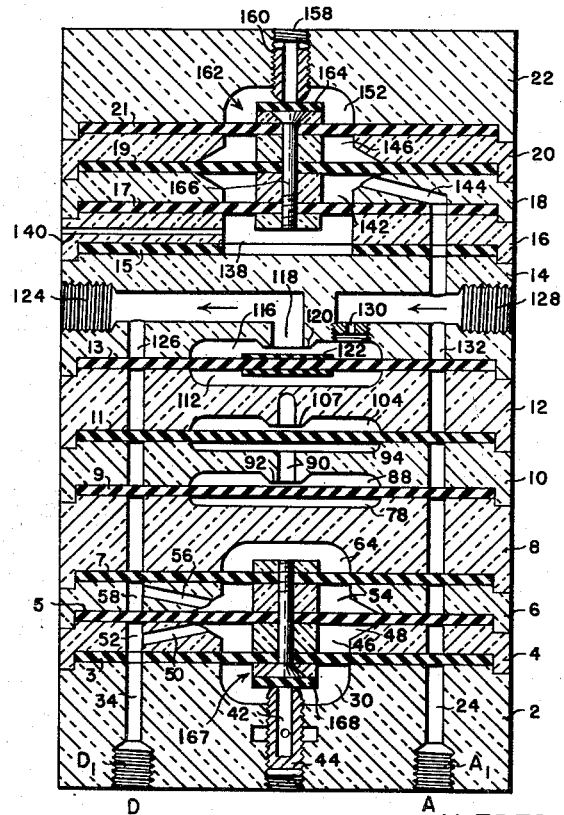
Figure 2 is a vertical section taken on the plane indicated at 2—2 in Figure 1.
Figure 4:
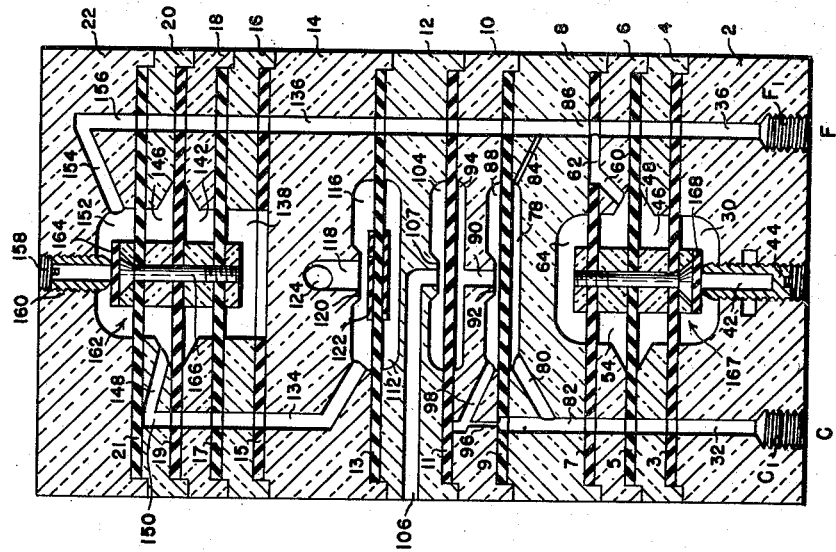
Figure 4 is a vertical section taken on the plane indicated at 4—4 in Figure 1.
Figure 3:
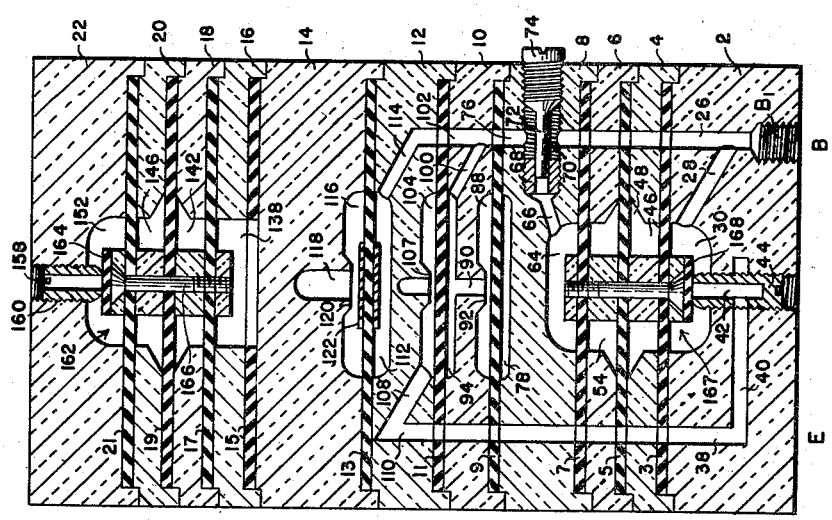
Figure 3 is a vertical section taken on the plane indicated at 3—3 in Figure 1.

First, it may be noted that aligned openings extend through the various discs and diaphragms along six different vertical lines through the assembly. The positions of these lines are indicated by the letters A, B, C, D, E and F. It will be noted that the sections constituting Figures 2, 3 and 4 are taken on vertical planes through pairs of these lines. The letters just mentioned will be hereafter referred to as the positions of various vertical openings.

Referring first to the disc 2, it will be noted that this is provided with enlarged tapped openings $A_1$, $B_1$, $C_1$, $D_1$ and $F_1$ corresponding to all of the positions except E. These tapped openings receive flanges secured to flexible tubes, which flanges are secured in the openings by means of threaded glands. The tubes may be formed of colored plastics to provide a code for easy identification of the connections. As will hereafter appear, the tubes provide for the flow of air or other fluid which is used in the controller for its operation.

From the opening $A_1$ there extends upwardly, the hole 24. From the opening $B_1$ there extends upwardly the hole 26 and laterally a branch hole 28 which communicates with a chamber 30 formed in the upper surface of the disc 2. From the openings $C_1$, $D_1$ and $F_1$ there extend upwardly the holes 32, 34 and 36, respectively. All of the foregoing upwardly extending holes pass through the upper surface of the disc 2.

In position E there is a hole 38 extending downwardly from the upper surface of the disc 2 but this hole does not reach the lower surface but, instead, has a radially directed inward branch 40 communicating with the interior bore 42 of a nozzle element 44 which is threaded in a central opening in the disc 2 and projects above the bottom of the chamber 30. This element 44 may be formed of stainless steel, brass or other metal, or, if desired, of plastic, and is provided with a screw driver slot for zero adjustment.

The disc 4 is provided with a central opening 46 providing, in the assembly, a chamber between the diaphragms 3 and 5. As will be noted from the figures, the lower area of this opening 46 is smaller than the upper area indicated at 48. This provides for different effective areas of the diaphragms 3 and 5. The chamber 46 communicates through a lateral hole 50 with a vertical hole 52 through the plate 4 in the position D. A vertical hole extends through the disc 4 in each of the other positions, as will be evident from the figures.

The disc 6 is provided with a central opening 54 which is similar to the opening 46 in disc 4 but inverted, i. e., the larger area of the opening 54 is at the bottom of the disc and the smaller area is at the top of the disc. A lateral hole 56 joins the chamber provided at 54 with a hole 58 through the disc 6 in position D. Another sloping hole 60 extends from the chamber 54 through the upper face of the disc 6 in the vicinity of, but not intersecting, a vertical hole through this disc in the position F. As will be evident from Figure 4, the hole 60 may be connected to the hole in position F by providing a specially large opening 62 in the gasket 7. Alternately, however, this connection may be prevented, when necessary in providing a different type of controller, by making the gasket 7 imperforate at the upper end of the hole 60.

In the positions other than those just mentioned the disc 6 is provided with vertical holes extending completely therethrough.

The lower face of the disc 8 is provided with a chamber 64 which communicates through a bore 66 with the interior of a tubular member 68 threaded in a radial tapped opening 70. A central spindle 72 extending from a screw 74 threaded in the opening projects into the bore of the element 68 to provide a restriction of variable type for flow of fluid through the hole 66. The interior of the opening 70 is in communication with the hole 76 which extends through both faces of the disc 8 in the position B.

In its upper face the disc 8 is provided with a shallow chamber 78 which communicates through a bore 80 with a vertical hole 82 extending through the disc 8 in the position C. The chamber 78 also communicates through a restricted bore 84 with the vertical hole 86 through the plate 8 in the position F. It may be here noted that, unless otherwise stated, the various passage openings through the discs are of adequate size, for example, one-eighth inch diameter, so as to provide no substantial restriction to flow. On the other hand, a restricted bore, such as 84, may have a diameter of about 1/64 inch so as to offer a substantial restriction to flow of air which may be considered to be the fluid used for control purposes.

In positions A, D and E the disc 8 is provided with holes extending completely therethrough.

Disc 10 is provided in its lower face with a chamber 88 which communicates through a bore 90 with a chamber 94 in its upper face. The lower end of the bore 90 is provided with an annular seat 92 with which is arranged to cooperate with the diaphragm 9 for the purpose of controlling flow through this opening. In position C there extends vertically through the disc 10 a restricted opening 96 which may, for example, have a diameter of 1/64 inch. The upper end of this bore communicates through the diagonal bore 98 with the chamber 88. A diagonal bore 100 connects the chamber 94 with a vertical hole 102 through disc 10 in position B. At the positions of disc 10, not specifically mentioned, there are holes extending completely therethrough.

A chamber 104 is provided in the lower face of the disc 12 and has a central port 106 extending radially to communicate with the atmosphere. Around the port 106 is a seat 107 for cooperation with the diaphragm 11. A passage 108 joins the chamber 104 with a hole 110 which extends through the bottom face of the disc 12 but does not penetrate its top face. In the upper surface of the disc 12 there is a chamber 112 which connects with an opening 114 which opens through the bottom face of the disc 12 in position B. In positions A, D and F the disc 12 is provided with holes which extend completely therethrough.

In its lower face the disc 14 is provided with a chamber 116 with which communicates a central bore 118 surrounded by a seat 120 which cooperates with the reenforced central portion 122 of the diaphragm 13. The bore 118 communicates with the lateral passage 124 which is threaded at its outer end for external connection. The passage 124 is in communication with a hole 126 projecting through the bottom surface of the plate 14 in position D. A lateral passage 128 threaded at its outer end for external connection communicates with the chamber 116 through a restricted orifice disc indicated at 130 threaded into the disc 14. This disc may be formed of hard rubber, stainless steel or other suitable material and is preferably replaceable not only for wear but to provide an orifice of any desired size suited to the flow rate of the fluid being controlled. A vertical hole 132 which extends through both faces of the disc 14 in position A communicates with the passage 128. The chamber 116 is connected to the passage 134 which opens through the upper face of the disc 14 in position C. A hole 136 extends through the disc 14 in position F. There are, however, no holes in positions B and E.

The disc 16 is provided with a central opening 138 providing a chamber. This chamber is vented to the atmosphere through the lateral passage 140. This passage is of small diameter so as to provide some restriction to flow. The disc 16 is provided with holes extending completely therethrough in the positions A, C and F.

Disc 18 is provided with an opening 142 forming a chamber which has a smaller area at the lower side of the disc than at the upper side. The chamber 142 communicates through passage 144 with an opening in the lower surface of the disc 18 in position A. Disc 18 is provided with holes extending completely therethrough in the positions C and F.

Disc 20 is provided with a central opening 146 providing a chamber which has a larger cross-sectional area at the lower face of the disc than at its upper face. A bore 148 connects the chamber 146 with the hole 150 extending through the disc 20 in position C. In position F the disc 20 is provided with a hole extending completely therethrough.

The lower face of the disc 22 is provided with a chamber 152 which communicates through bore 154 with an opening 156 extending through the lower face of disc 22 in position F.

A central bore 158 in the disc 22 has threaded therein an orifice member 160, of stainless steel, brass or plastic, having a central bore.

The central portions of the diaphragms 17, 19 and 21 are secured together by a clamping assembly indicated generally at 162 and comprising a group of washers connected by a screw 166. This assembly is provided on its top surface with a valve element 164, of vinyl chloride plastic or other suitable material, arranged to cooperate with the lower edge of the orifice member 160.

The central portions of the gaskets or diaphragms 3, 5 and 7 are similarly connected by a clamping assembly indicated generally at 167 and provided on its lower face with a valve element 168 cooperating with the upper edge of the orifice member 44.

As stated, the apparatus illustrated in Figures 1 to 4, inclusive, is arranged for control of flow, the flow to be controlled entering at 128 and leaving at 124. The apparatus may be regarded as comprising four units. The first of these is a flow measurement and transmission unit which involves the assembly above the disc 14. The control valve arrangement is provided by the diaphragm 13 operating between the discs 12 and 14. A constant flow and pressure pilot assembly is provided by the diaphragms 9 and 11 and the parts associated therewith. The controller is made up of the assembly involving the discs 2, 4, 6 and 8 and the diaphragms between these and associated parts.

First there may be referred to the external connections to the disc 2. The opening $A_1$ is not used in the flow controller, and it will be noted that the passage 24 is closed off by the gasket 3.

The opening $B_1$ may be plugged or it may be connected to a gauge if it is desired to observe the control pressure.

The supply of operating air is connected at $C_1$. This supply may be regulated to an approximately constant pressure though, as will appear hereafter, this is by no means essential.

The control point pressure is applied at the connection $D_1$. This, in general, will be read on a gauge and will be controlled by a manually or otherwise adjustable pressure control device external to the apparatus shown in these figures.

To $F_1$ there is connected the line for the transmission of pressure serving as a measure of the pressure drop occasioned by the flow undergoing control. This connection may run to a pressure gauge or to some additional control apparatus.

The operation of the described apparatus will now be given. The fluid undergoing control enters at 128 and leaves at 124. For simplicity of description this fluid may be considered to be a liquid though it will be obvious that an elastic fluid may be equally well controlled. The flow of the liquid through the orifice 130 produces a pressure drop which is utilized as a measurement of the rate of flow. The upstream side of the orifice 130 is connected through 144 to the chamber 142 beneath the diaphragm 19, while the downstream side of this orifice is connected through 134 and 148 to the chamber 146 above the diaphragm 19. It will be evident that, by reason of these connections, there will be produced a net upward force on the diaphragm 19 corresponding to the pressure drop across the orifice.

The air supply at $C_1$ flows through 32, 82 and 80 into the chamber 78 from which flow takes place through the restricted passage 84 into the vertical passage in position F including the holes previously described at 36, 86, 136 and 156. Air from this passage passes through 154 into the chamber 152 where it will apply to the upper side of diaphragm 21 a force to balance the net upward force produced by the pressures in the chambers 142 and 146. It should be noted that the chamber 138 is connected to the atmosphere through passage 140. The arrangement of valve 164 with respect to the orifice member 160, which connects to the atmosphere, insures that the pressure balance described will take place; if the pressure in chamber 152 rises above the pressure required for balance the assembly 162 will move downwardly, venting the chamber 152 to the atmosphere, to provide an increased flow so that the supply air having a pressure drop through the restriction 84 will be reduced to a pressure in the chamber 152 and its connections which is just proper for balance. On the other hand, if the pressure at 152 should be too small the valve 164 will move further toward its seated position so as to throttle the flow until the pressure is built up to achieve a balance of forces as described. It may be here pointed out that the pressure in chamber 152 in general is not required to be accurately given so as to be substantially independent of the spring action of the diaphragms 17, 19 and 21. However, if these diaphragms are made of plastic of the type previously described, they will be quite flexible to the end that their stiffness will tend to produce no substantial errors in the correspondence of the pressure in chamber 152 to the pressure drop across the orifice 130; and, at any rate, there will be a definite reproducible relationship, determinable by calibration, even though it may not be calculated. For accurate measurement of flow a direct reading, calibrated rotameter may be inserted in the flow line. Actually, the range of movement of the valve member 164 will be very small and at a maximum of the order of a few thousandths of an inch. The stiffness of the diaphragms is accordingly negligible at this point. However, if desired, a constant flow and pressure pilot arrangement may be provided as will be presently described in connection with the controller.

In view of the fact that the area of the diaphram 19 exposed to pressures is greater than the areas of the diaphragms 17 and 21 exposed to pressures, the pressure in chamber 152 will not be equal to the difference of the pressures in chambers 142 and 146; it will, however, be proportional to this difference, there being involved, due to the differences in area, a magnification.

The pressure in chamber 152 appears throughout the vertical line of openings in the position F and this pressure may be transmitted through a connection to $F_1$ to a gauge or other instrument as may be desired.

This pressure is also applied through 62 and 60 to the chamber 54 above the diaphragm 5. Below this diaphragm 5 there is applied to the chamber 46 the set point control pressure provided through connection $D_1$ and passages 34, 52 and 50.

There may now be considered the arrangement constituting the constant flow and constant pressure pilot. Consider the initial supply of air at the connection $C_1$. This will provide an upward force on the diaphragm 9 which would serve to cause it to seat at 92 to close off the passage 90 from the chamber 88. However, air will flow through the restricted pasage 96 into the chamber 88 above the diaphragm 9. The diaphragm 9 has some stiffness and, accordingly, when it is seated at 92 there will be a spring force tending to move it downwardly. The result is that, as the pressure in chamber 88 builds up, an equilibrium condition will be secured when there exists a pressure difference between the lower and upper sides of the diaphragm 9 which will give rise to a force equal to the spring force which is tending to unseat the diaphragm 9. In a typical arrangement there may be involved a pressure difference of about one-half pound per square inch under these equilibrium conditions. Due to the fact that a very small movement of the diaphragm 9 will result in a very large change of the resistance to flow between the diaphragm and its seat 92, it will be evident that the action above referred to maintains a substantially constant pressure drop across the diaphragm and, consequently, across the restricted passage 96. But since a constant pressure drop across a fixed resistance produces a constant flow, it will be evident that the operation just indicated result in control of a substantially constant flow through passage 96 and, accordingly, through the passage 90 which vents the chamber 88. This flow will provide a pressure in the chamber 94 beneath the diaphragm 11. This constant flow then takes place through the passages 100, 76, 26 and 28 to the chamber 30.

From the chamber 30 the constant flow must take place between the valve member 168 and the end of the orifice element 42 thence through connections 40, 38, 110 and 108 to the chamber 104 and from this chamber through the outlet 106 to the atmosphere. The pressure in the chamber 94 will tend to flex upwardly the diaphragm 11 to seat it at 107 to cut off the outlet from the chamber 104. Again, there enters into the picture the spring action of the diaphragm, and it will be seen that an equilibrium will be attained when the flow entering the chamber 104 is vented through a clearance between diaphragm 11 and seat 107 so that the pressure difference between chamber 94 and chamber 104 is just sufficient to maintain the diaphragm 11 in a condition of very slight clearance with respect to the seat 107. Here again, the pressure difference may, due to the stiffness of the diaphragm 11, amount to about one-half pound per square inch in a typical controler. The result is the maintenance of a constant pressure difference between the two chambers, and since these chambers are respectively connected to the upstream and downstream portions of the restriction provided between the orifice member 42 and the valve 168, the same constant pressure occurs at this point as a drop across the resistance there appearing. The result of this is that across the restriction between valve member 168 and the orifice member 42 there is constant flow and constant pressure drop. As a result, equilibrium can be obtained only when the valve member 168 is in some precise constant position, providing such constant resistance that the constant flow will produce the constant pressure drop, with the result that the stiffness of the assembly, including the diaphragms 3, 5 and 7, has an entirely negligible effect.

Assume now that an equilibrium has been attained and that the pressures in chambers 46 and 54 are equal and the pressures in chambers 30 and 64 are also equal. Starting with this condition of equilibrium, assume that an increase in flow rate through the orifice 130 occurs due to some external cause.

The resulting increase in pressure drop across the orifice 130 will produce a corresponding pressure increase in the vertical line of openings in position F. The result is to produce a pressure in chamber 54 exceeding the set point pressure in chamber 46 thus tending to move the valve 168 toward the orifice 42 producing a build-up in pressure in chamber 30 which will restore the diaphragms 3, 5 and 7 to such position that the valve member 168 will take its normal position involving the constant pressure drop and constant flow rate previousy referred to. (Note that when the pressure in chamber 30 increases, the constant pressure pilot arrangement will immediately raise the pressure at 42 to maintain the pressure drop between 30 and 42 at its constant value.)

The increase in pressure in chamber 30 involves a corresponding increase in pressure in chamber 112 below diaphragm 13 resulting in an upward movement of the diaphragm 13 to throttle the flow between the entrance 128 and the exit 124.

The initial movement of the diaphragm 13, however, will in general not suffice to produce the necessary reduction in the flow rate. Assuming that correction is not achieved, flow takes place through the clearance between member 68 and the needle valve member 72 so as to produce a rise in pressure in chamber 64. This rise in pressure will take place at a substantially uniform rate since, for every increment in pressure in the chamber 64, the pressure in chamber 30 will increase by the same increment because of the action to maintain equilibrium of the assembly of the diaphragms 3, 5 and 7. In other words, there is a constant pressure drop across the restriction offered between the members 68 and 72. Accordingly, the pressure in the chamber 30 continuously rises until correction is achieved and equilibrium is reestablished with the pressure in chamber 54 equal to the pressure in chamber 46, and with the pressure in chamber 30 equal to the pressure in chamber 64. The only alternative, if equilibrium is not established, is the increase in pressure in the chamber 30 up to the value of the supply pressure when, of course, the controlling action must cease. Assuming that an equilibrium is attained with proper correction of the flow rate, the final pressure in chamber 30 will, in general, be different from the pressure therein prior to the disturbance. The attainment of correction of the flow rate by the present apparatus takes place with extreme rapidity. Flow controllers now available have flow control reset rates involving about 10 repeats per minute as a maximum. The present apparatus involves reset rates corresponding to 100 to 1000 repeats per minute.

It will be evident that actions of a similar but reversed nature will take place if the flow rate happened to decrease. Likewise, similar actions in attaining equilibrium will occur if the control point pressure is changed either by being increased or decreased. Details of these actions need not be given.

Before passing to a discussion of variations of the described apparatus for the production of other types of control, reference may be made to the action of the flow controlling arrangement provided by the diaphragm 13. This diaphragm may be flexible to the same extent as the other diaphragms which have been described. The diaphragm, accordingly, has an excellent controlling action since, when it provides a wide open space for the flow, very little resistance is offered to the flow whereas, on the other hand, it may move very close to the seat 120 to provide very considerable restriction or, in fact, it may tightly engage the seat so as to shut off the flow entirely. The valve thus provided is of a type which is quite free of likelihood to become clogged even if slurries, or the like, are being controlled.

In contrast with the usual valve involving a stem taking various particular positions for various air-loading pressures, the diaphragm 13 is free to move until rebalanced by the fluid pressure. For example, when the air pressure below the diaphragm increases by one pound the gasket will rise until it has increased the pressure drop through the valve opening and decreased the up-stream pressure drops by a total of nearly one pound. It is, therefore, rebalanced by control action which it accomplishes rather than by an arbitrary stem position.

It may be noted that extreme accuracy of control is afforded by reason of the maintenance of both constant flow and constant pressure drop between the valve member 168 and the orifice member 42. As has been indicated, the pilot arrangement providing this constant flow and pressure drop might also be applied to the flow between the valve member 164 and the orifice member 160. Usually, however, this is not required.

The flow controller having been described in detail, there will now be described the alternative arrangements of the apparatus for securing other control functions. However, to avoid the necessity for repeating structural details, there is provided in Figure 5 a diagram which will make clear the alternative connections which are required for other purposes.

At the left in this figure there are roughly diagrammed the chambers, diaphragms, and passages, which are detailed in Figures 2, 3 and 4. Under the various designations of controllers at the right, there are given the letters corresponding to the vertical lines of passages, heretofore described. In vertical alignment with these letters are lines and other legends indicating the connections appearing in those positions to the various chambers and passages. The solid vertical lines indicate necessary connections. Dotted vertical lines indicate optional connections depending upon the particular special functions which may be desired, for example, the transmission of flow or pressure to remote apparatus. At 74 there is indicated the adjustable reset rate controller which adjusts the restriction between the elements 68 and 72 to control the flow through the passage 66 to the chamber 64. The connections marked with crosses indicate the restrictions 96 and 84. The inflow and outflow connections 124 and 128 are also shown on the diagram.

Figure 5:
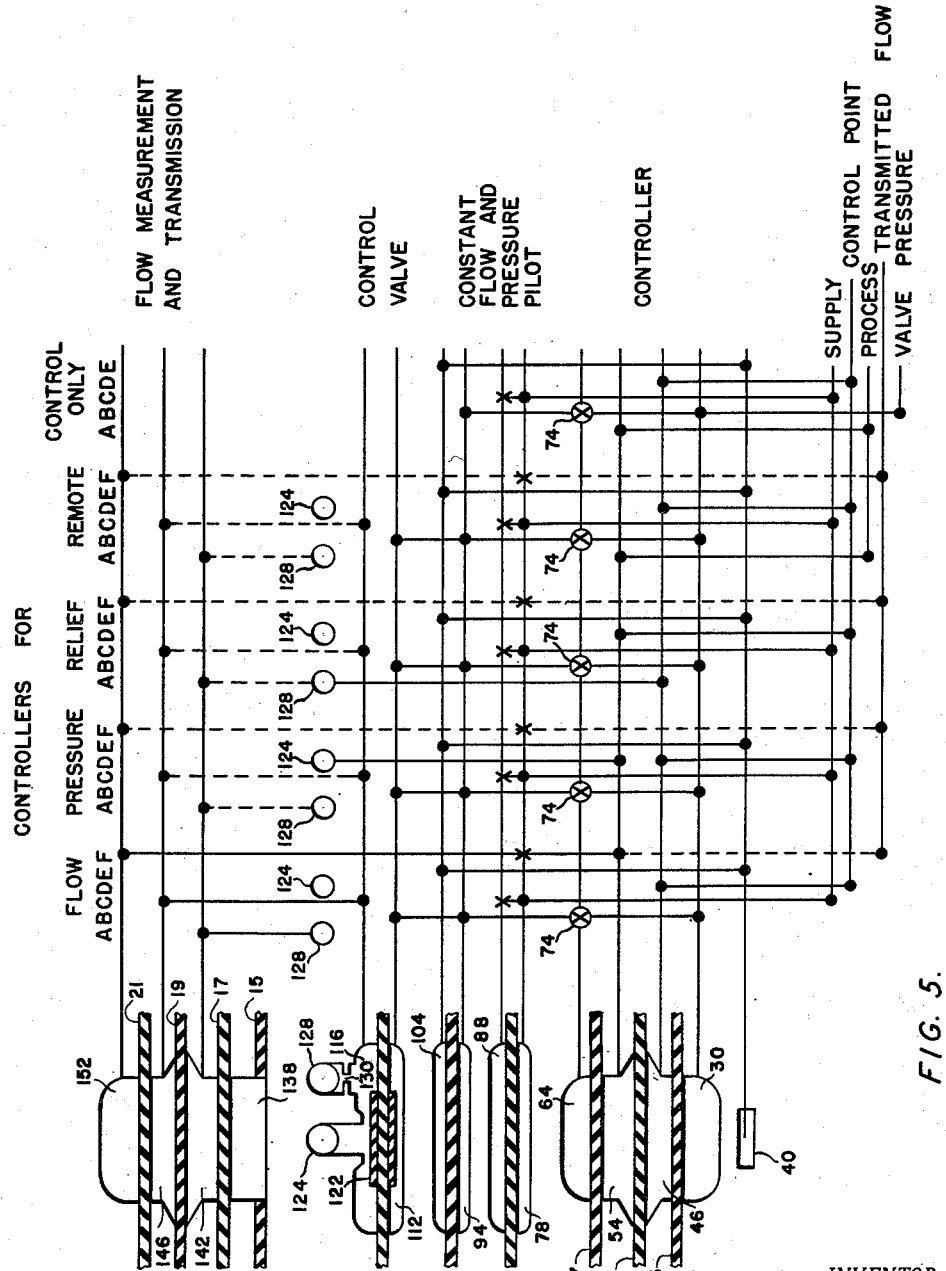
Figure 5 is a diagram showing in particular modifications of the internal connections of the apparatus generally shown by Figures 1 to 4, inclusive, for the purpose of modifying it to provide controllers for other purposes than flow control.

The significance of the diagrams in Figure 5 will become apparent if the connections indicated under "Flow" are compared with the specific showings of the passages in Figures 2, 3 and 4. It will be found that the diagrammatic showing corresponds to the details previously described. Mention may be made of the dotted line running below the connection to chamber 54 to the external line which is designated "transmitted flow." This represents an optional connection which may be provided if it is desired to transmit the pressure appearing in chamber 54 to an external gauge or other device. The optional connection is not required if there is merely desired, without measurement, the control of the flow entering at 128 and leaving at 124.

The second alternative arrangement diagrammed in Figure 5 relates to the control of a pressure in a receptacle by the control of the flow of a fluid thereto, this control of flow being, in the present apparatus, by the valve action of the diaphragm 13.

Reference may first be made to the optional connections indicated in the positions A, C and F. It will be noted that these optional connections differ from those described for the flow controller in that the connections on line F are not made to the chamber 54. This alternative is provided by having in the diaphragm 7 only a small opening in the position F so that the passage 60 to the chamber 54 is blocked off. If the description of the flow controller is considered, it will be obvious that these optional connections involve the delivery, through the connection $F_1$, of a pressure which will give a measure of the rate of flow through the passages 128 and 124. However, the flow will not be maintained constant, but instead, will be controlled to maintain a constant pressure in the outlet passage 124. The optional connections providing for measure of flow rate without control of flow rate, as such, are generally useful and are accordingly shown in this alternative arrangement as well as in others hereafter described. Even though some other type of control is desired, it is quite commonly necessary to measure a rate of flow of a fluid in a process. The present apparatus permits the flow rate to be measured by leaving these optional connections available even though the apparatus is used for some other type of control.

In the flow controller, as illustrated in Figure 2, the connection 126 from the passage 124 was cut off. In the pressure controller now under consideration this passage 124 is connected to the chamber 54 by the provision of suitable openings in the diaphragms 7, 9, 11 and 13 in the position D. The diaphragm 5 remains unperforated in position D so that the control point pressure may be applied through 34, 52 and 50 to the chamber 46. By reason of the connection of passage 124 to chamber 54, the pressure in passage 124 becomes the variable subject to control. This control is effected by the action of the diaphragm 13 in conjunction with its seat 120.

As will be seen from the diagram, the connections at B and E are the same as before. In the case of position C the connections are the same up to the chamber 88. In position D the connections are also the same insofar as they relate to the admission of control point pressure to the chamber 46.

Consideration of the connections mentioned will readily reveal that the control operations are the same as before except for the difference in the process variable involved. The operation takes place with the same functions of the constant flow and pressure pilot as before, and the controller acts to regulate the flow through the passage 124 so as to maintain the pressure in this passage at the control point.

The third alternative diagram is the relief controller. In this alternative, the pressure on the upstream side of the flow control valve is now to remain constant, i. e., the pressure in connection 128 is to be maintained constant by the relief action of the diaphragm 13 permitting flow to take place whenever this pressure becomes higher than the control point pressure. It will be seen that this action means that an increase of pressure must open the valve rather than close the valve, as in the case of the flow and pressure controllers. This involves a reversal of connections, which will be presently described.

The optional connections for measurement of flow are as previously described. The connections in the positions B, C, E and F are, accordingly, as described for the pressure controller. The only difference over the pressure controller is that the control point pressure is applied to chamber 54 rather than to chamber 46, and the process variable pressure is applied to the chamber 46 rather than to the chamber 54. These reversed connections may be most easily achieved without the necessity for providing any different discs by turning the disc 4 through 180° and by providing suitable diaphragm perforations. It will be noted that such a positioning of the disc 4 will bring connections 50 and 52 into the position A and these are connected to the inlet passage 128 by providing perforations in the diaphragms 5, 7, 9, 11 and 13 in the position A. At the same time, by perforating the diaphragm 5 in the position D the control point pressure is applied to the chamber 54. The foregoing is to secure the maintenance of a constant pressure in the connection 128 by the relief action of the diaphragm 13 controlling the flow; and here, as before, the constant flow and pressure pilot arrangement performs the function described in detail above.

The remote control alternative involves merely the maintenance of a constant pressure at some point in a process other than between the inlet 128 and the outlet 124, this remote pressure being maintained constant by the control of flow by the diaphragm 13. The arrangement illustrated in the diagram under this designation is for direct valve action, that is, an increase in the remote pressure is to close the valve constituted by the diaphragm 13. Comparison with the pressure control arrangement will reveal that this remote control arrangement involves the remote process connection to chamber 54 with the application of the control point pressure to the chamber 46. This may be most simply achieved by turning the disc 6 through 180°, as compared with its position in Figure 2, so that passages 58 and 56 to the chamber 54 are brought into the position A. Diaphragms 3 and 5 are perforated in position A so that the process pressure to be controlled may be applied through connection A₁ and opening 24, the aligned opening in position A in disc 4 and the openings 58 and 56 in disc 6.

For reverse valve action, i. e., an action to open the valve upon increase of the remote pressure, the connection from the remote pressure should be through A₁ to chamber 46, and the control point pressure should be applied through connection D₁ to chamber 54. This can be achieved by turning the disc 4 through 180°, as in the case of the relief controller, previously described, with suitable obvious perforations in the various diaphragms.

The last alternative diagrammed in Figure 5 will be obvious when considered in comparison with the previous diagrams. This alternative involves the application of a variable process pressure from a point remote from the apparatus and delivery of a controlling pressure, called the valve pressure in Figure 5, to a remote point rather than to the valve constituted by the diaphragm 13. It will be seen that the connections are the same as those for the pressure controller except that the controlled pressure is not applied to the chamber 112 but is taken off through the connection B₁. As diagrammed, an increase in process pressure will produce an increase in the delivered pressure. A reverse arrangement, however, may be provided, as in the case of the relief controller, so that the process pressure will produce a delivered pressure of opposite sense. It will be evident that the process pressure applied in this control arrangement may be a pneumatic pressure corresponding to any variable which it is desired to use and maintain constant. Various types of pneumatic transmitters may be used. Furthermore, the output pressure, though designated as valve pressure in Figure 5, may be used to control any type of apparatus involved in the process with which the controller is associated.

Figure 8:
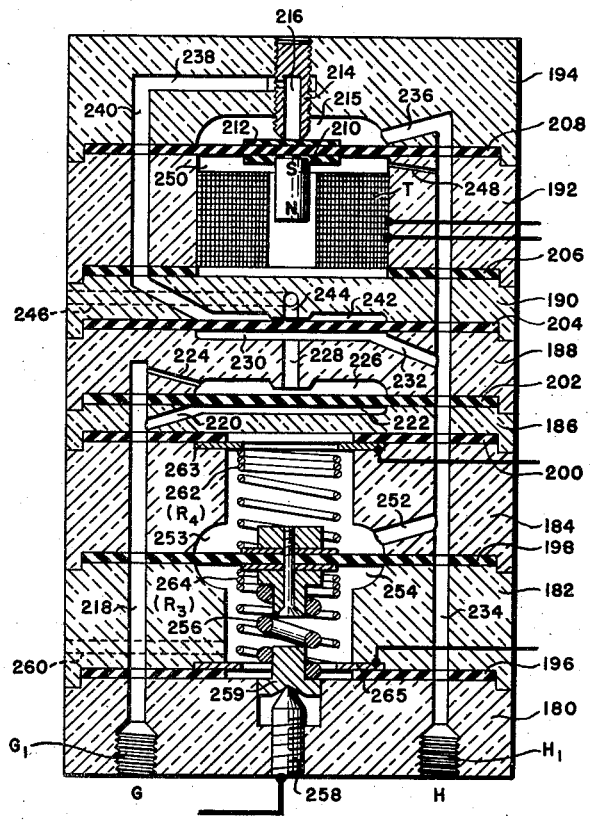
Figure 8 is a vertical section through the transmitter proper involved in such bridge.
Figure 7:
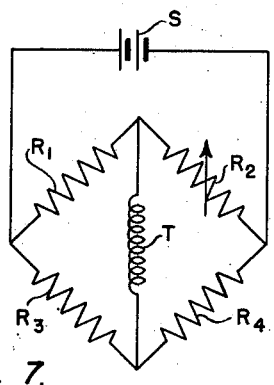
Figure 7 is a diagram of the electrical connections of a self-balancing Wheatstone bridge transmitter.

Reference may be made to Figures 7 and 8 for an example of a transmitter which may be used in connection with the apparatus already described. This transmitter may be involved in a self-balancing Wheatstone bridge which may be utilized for the production of a pressure in response to changes of a resistance produced by change of temperature or of a mechanical force or the like. As will appear hereafter it may also be used in conjunction with other types of electrical circuits, such as potentiometer circuits, so as to give rise to a pressure in response to a change of a potential or a current which in turn may depend on some other process variable. This transmitter is particularly described because it involves, in both construction and operation, various features of the general invention involved herein.

Referring first to Figure 7 there is illustrated therein a conventional Wheatstone bridge diagram energized by a battery or other direct current source S. The resistance $R_1$ may be considered to be the variable resistance of a strain gauge or the variable resistance offered by change of temperature of an element having a large temperature coefficient of resistance such as the type of element known commercially as a "thermistor." The last is particularly useful in small scale processes since it is of quite small size and may be readily located in small tubes or other passages or chambers. The resistance $R_1$ may, of course, be any variable resistance.

The resistance $R_2$ is a fixed or adjustable standard reference resistor.

The resistances $R_3$ and $R_4$ are constituted by variable resistance elements involved in the apparatus of Figure 8 and will be hereafter described in greater detail. The coil T which has current flowing through it upon unbalance of the bridge also forms part of the apparatus to be described. It will be evident from Figure 7 that the direction of current flow through the coil T depends upon the direction of unbalance of the bridge.

It will also be apparent that instead of providing a resistance $R_1$ subject to variation, the arm of the bridge containing that resistance may be connected to some means providing variation of potential due to a variable potential or current.

Reference may now be made to Figure 8. The apparatus there shown comprises a series of blocks or discs 180, 182, 184, 186, 188, 190, 192 and 194 which may be similar in both materials and construction to the discs heretofore described. Between them are clamped the diaphragms or gaskets 196, 198, 200, 202, 204, 206 and 208 which also may have the type of construction and may be formed of the materials previously described.

As in the case of the apparatus already discussed in detail, the discs are provided with various passages and form chambers and the gaskets or diaphragms are perforated to provide passages for air. Since the details of construction will be clear from the foregoing description, they will not be described in connection with this apparatus. The vertical passages may, in the present instance, be confined to lines running vertically in the positions indicated at G and H.

The diaphragm 208 carries a permanent magnet with its axis vertical, as indicated at 210. This magnet extends within the upper end of a solenoid constituting the coil T of Figure 7. The central part of the diaphragm 208 is formed as a valve 212 which cooperates with an orifice member 214 to restrict passage of air from the chamber 215 above the diaphragm 208 to the passage 216 in the member 214, threaded into block 194.

Air is supplied to a vertical passage 218 in position G through the connection indicated at $G_1$. Air from the passage 218 is delivered through connection 220 to the chamber 222 below the diaphragm 202, and is also delivered through the restricted passage 224 to the chamber 226 above the diaphragm 202. The diaphragm controls escape of air through the passage 228 to the chamber 230 below the diaphragm 204. From this chamber the air may pass through connection 232 to the vertical passage 234 in position H. From this passage 234 the air flows through the passage 236 into the chamber 215. From the passage 216 the air flows through the passages 238 and 240 to the chamber 242 above the diaphragm 204 which controls the flow to passage 244 communicating with the atmosphere through the lateral connection 246.

A comparison of what has just been described, particularly with Figures 3 and 4, will reveal that the arrangement will produce a constant pressure drop between the chamber 215 and passage 216, and will also insure that there is a constant rate of flow of air through the passage 216. As previously detailed, this insures that a stable position of the diaphragm 208 can be attained only when the valve portion 212 of this diaphragm bears a predetermined and fixed relationship with the orifice member 214. In other words, equilibrium is only attained when the magnet 210 occupies a particular fixed and definite position with respect to the coil T. This eliminates from consideration any spring constant of the diaphragm 208. It will be noted that there is a restricted connection 248 between passage 234 and the chamber 250 which houses the coil T below the diaphragm 208. This fixed restriction 248 corresponds to the adjustable restriction provided by the elements 68 and 72 in Figure 3, and it will be evident that, as in Figure 3, this restriction may be made adjustable, if desired, to provide adjustable speed of response.

(The relationship of what has been described in connection with Figure 8 to what is shown in Figures 3 and 4 may be best made apparent if it is noted that the passage 218 in Figure 8 corresponds to the passage 32, 82 in Figure 4, restriction 224 corresponds to restriction 96, chambers 222 and 226 correspond, respectively, to chambers 78 and 88, chambers 230 and 242 correspond, respectively, to chambers 94 and 104, passage 234 corresponds to the passage including 26 in position B in Figure 3, orifice member 214 corresponds to orifice member 44, and vent 246 corresponds to vent 106.)

Chamber 253 above diaphragm 198 is connected to passage 234 through connection 252. The chamber 254 below the diaphragm 198 is vented to the atmosphere through the lateral passage 260. A spring 256 urges the diaphragm 198 upwardly, and the pressure applied by this spring is adjustable through a screw 258 threaded in the disc 180 and providing a support for the spring seat 259.

Between the diaphragm 198 and a fixed metallic annulus 263 carried at the upper surface of disc 184 there is a spring of known variable tension type. This spring is of a type which, when completely relaxed, has its convolutions in contact with each other. As it is extended, the convolutions successively move apart, as indicated in Figure 8. The result is that, if such a spring is made of wire of relatively high resistance, the electrical resistance through the spring increases continuously as the spring is extended and decreases continuously as the tension on the spring is released. In other words, a spring of this type provides a resistance which is continuously variable depending upon the degree of extension of the spring. A similar spring 264 is provided between the diaphragm and the supporting annulus 265 located at the lower surface of the block 182. Referring to Figure 7, the spring 262 constitutes the resistance $R_4$ and the spring 264 constitutes the resistance $R_3$. It will be evident that as the diaphragm 198 rises, the resistance $R_4$ will decrease and the resistance $R_3$ will increase, with reverse changes of these resistances when the diaphragm 198 moves downwardly.

From the foregoing, the operation of the apparatus of Figure 8 will be clear. Assuming that the resistance of $R_1$ decreases, due to change of temperature, strain, or some other variable in the process, or that the bridge is equivalently unbalanced by the introduction of a potential in the arm containing $R_1$, current will flow through the coil T repelling the magnet 210 and raising slightly the diaphragm 208 producing a restriction of flow controlled by this diaphragm. In accordance with the actions already detailed, the pressure in passage 234 will rise lengthening the spring 262 and increasing the resistance $R_4$, and at the same time, shortening the spring 264 and decreasing the resistance $R_3$ until the bridge is rebalanced. When current in the coil ceases to flow at balance, the magnet 210 and diaphragm 208 resume their initial positions. Floating action, of course, occurs due to the bleed of air through restriction 248 into the chamber 250 so that equilibrium may be ultimately reached with the pressure in passage 234 corresponding to the new value of the resistance $R_1$, or an equivalent change in the bridge. This pressure may be transmitted through the connection $H_1$ to be read on a gauge which may be calibrated in corresponding temperature, force, or other units involved in the variation of $R_1$, or an equivalent variation. While the apparatus just described is useful per se merely to provide a measure for the variation involved, it will be evident that the output pressure from $H_1$ may be applied as the process pressure to the two types of apparatus last described in connection with Figure 5. Thus, the output pressure of the apparatus of Figure 8 may be used for control purposes.

It will be evident that various other types of transmitters may be used in connection with the apparatus described and illustrated in Figures 1 to 5, inclusive, provided that they transform process variables into pressures. Many transmitters of this type are known to the art and may be used in connection with the controller.

It will be evident that the simple construction of the controller is adapted for the provision of controllers of types other than that specifically illustrated. For example, by providing suitable chambers and passages in association with, or substituted for, those specifically described, there may be provided controllers having derivative control or other types of operation. In such alternative types of controllers, the advantages of the invention will be maintained through the use of stacked blocks or discs and gaskets or diaphragms of the general type described. In all cases, short and direct connections are provided giving rise to stability and high rate of response.

Figure 6:
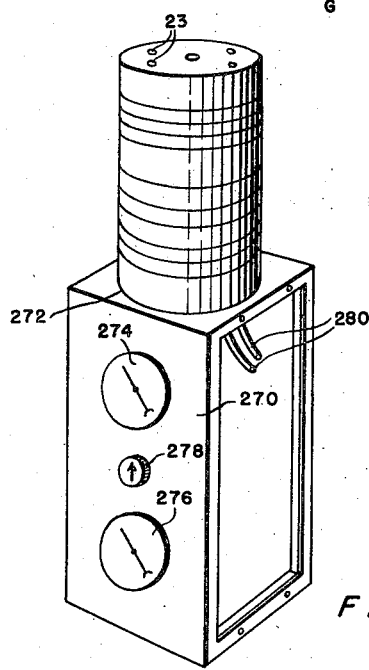
Figure 6 is a perspective view showing the fashion in which the improved type of control apparatus may be associated with pressure gauges for the purpose of providing a laboratory unit for the control of experimental apparatus.

In Figure 6 there is illustrated one fashion in which a controller of the type illustrated in Figures 1 to 4 may be mounted, though it will be evident that many alternative types of mountings may be used. A panel arrangement 270 may be provided with a socket 272 in which the controller may be seated, being bolted down by clamps held at the lower ends of the bolts 23. This panel may carry a pair of pressure gauges indicated at 274 and 276, the former to indicate the pressure corresponding to the process variable, and the latter indicating the set point pressure under control of a pressure regulator manipulated through the medium of a knob 278 and mounted behind the panel. At 280 there are indicated the flexible tubes which may be used for connections to and from the controller.

It will be evident that any number of units of the type described may be ganged as may be necessary for control of an elaborate process, using suitable transmitters for converting various process variables to pressures to which the controller may respond, either for control or measurement or both. One example of such a transmitter has been described with reference to Figures 7 and 8 and may be used when the original process variable is most conveniently transformable into an electrical signal. Temperature, for example, may be caused to give rise to a pressure in many ways in addition to that described, for example by using the expansion and contraction of a fluid. Specific gravity is readily convertible into a pressure difference by causing a definite column of liquid to produce a force by its weight. Thermal conductivity may give rise to temperature changes convertible into electrical signals, in turn convertible into pressures. Other variables such as index of refraction, pH, electrical conductivity, viscosity, rate of gas absorption, etc., may also be converted into pressures and hence used to provide the process variable for the present apparatus. Hereinafter in the claims when the term "process fluid flow" is employed, it should be understood as referring to the flow passing through the passages 128 and 124.

What is claimed is:

1. Apparatus of the type described comprising a stack of rigid elements assembled with diaphragms interposed between adjacent elements, said elements being provided with chambers closed by at least some of said diaphragms, the last mentioned diaphragms being flexible, some of said elements being provided with orifices adjacent to said flexible diaphragms and controllable thereby, and said elements being provided with fluid passages interconnecting said chambers and orifices and providing external connections for fluid flow, certain of said passages being in aligned positions in said stacked elements and having their continuity interrupted by said diaphragms.

2. Apparatus of the type described comprising a stack of rigid elements assembled with diaphragms interposed between adjacent elements, said elements being provided with chambers closed by at least some of said diaphragms, the last mentioned diaphragms being flexible, at least one of said elements being provided with an orifice adjacent to one side of a first of said flexible diaphragms and controllable thereby, and said elements being provided with fluid passages including passages interconnecting said chambers and orifice and providing external connections for process fluid flow through said orifice, the assembly providing a pair of said chambers on opposite sides of a second of said flexible diaphragms with connections to supply to one of said pair of chambers a reference pressure and to the other of said pair of chambers a variable pressure, a third chamber closed by a third of said flexible diaphragms, the second and third diaphragms being connected for simultaneous movement and controlling an orifice to provide escape of fluid from said third chamber, and means supplying fluid to the third chamber, said fluid passages also including passages interconnecting said third chamber and a chamber on the opposite side of said first flexible diaphragm.

3. Apparatus of the type described comprising a stack of rigid elements assembled with diaphragms interposed between adjacent elements, said elements being provided with chambers closed by at least some of said diaphragms, the last mentioned diaphragms being flexible, at least one of said elements being provided with an orifice adjacent to one side of a first of said flexible diaphragms and controllable thereby, and said elements being provided with fluid passages including passages interconnecting said chambers and orifice and providing external connections for process fluid flow through said orifice, the assembly providing a pair of said chambers on opposite sides of a second of said flexible diaphragms with connections to supply to one of the pair of chambers a reference pressure and to the other of said pair of chambers a variable pressure, a third chamber closed by a third of said flexible diaphragms, a fourth chamber closed by a fourth of said flexible diaphragms, said second, third and fourth diaphragms being connected for simultaneous movement and controlling an orifice to provide escape of fluid from said third chamber, and means supplying fluid to the third chamber and, through a fluid resistance, to said fourth chamber, said fluid passages also including passages interconnecting said third chamber and a chamber on the opposite side of said first flexible diaphragm.

4. Apparatus of the type described comprising a stack of rigid elements assembled with diaphragms interposed between adjacent elements, said elements being provided with chambers closed by at least some of said diaphragms, the last mentioned diaphragms being flexible, at least one of said elements being provided with an orifice adjacent to one of said flexible diaphragms and controllable thereby, and said elements being provided with fluid passages interconnecting said chambers and orifice and providing external connections for process fluid flow through said orifice, the assembly providing a pair of said chambers on opposite sides of a first flexible diaphragm with connections to supply to one of the pair of chambers a reference pressure and to the other of said pair of chambers a variable pressure, a third chamber closed by a second flexible diaphragm, the first and second diaphragms being connected for simultaneous movement and controlling a second orifice to provide escape of fluid from said third chamber, means supplying fluid to the third chamber, and means controlling a substantially constant rate of flow of fluid through said second orifice and a substantially constant pressure drop across said second orifice.

5. Apparatus of the type described comprising a stack of rigid elements assembled with diaphragms interposed between adjacent elements, said elements being provided with chambers closed by at least some of said diaphragms, the last mentioned diaphragms being flexible, at least one of said elements being provided with an orifice adjacent to one of said flexible diaphragms and controllable thereby, and said elements being provided with fluid passages interconnecting said chambers and orifice and providing external connections for process fluid flow through said orifice, the assembly providing a pair of said chambers on opposite sides of a first flexible diaphragm with connections to supply to one of the pair of chambers a reference pressure and to the other of said pair of chambers a variable pressure, a third chamber closed by a second flexible diaphragm, a fourth chamber closed by a third flexible diaphragm, the first, second and third diaphragms being connected for simultaneous movement and controlling a second orifice to provide escape of fluid from said third chamber, means supplying fluid to the third chamber and, through a fluid resistance, to said fourth chamber, and means controlling a substantially constant rate of flow of fluid through said second orifice and a substantially constant pressure drop across said second orifice.

6. Apparatus of the type described comprising a stack of rigid elements assembled with diaphragms interposed between adjacent elements, said elements being provided with chambers closed by at least some of said diaphragms, the last mentioned diaphragms being flexible, at least one of said elements being provided with a first orifice adjacent to one side of said flexible diaphragms and controllable thereby, and said elements being provided with fluid passages including passages interconnecting said chambers and orifice and providing external connections for process fluid flow through said orifice, the assembly providing connected flexible diaphragms responsive to the difference between a reference pressure and a variable pressure applied to first and second chambers and controlling a second orifice to provide escape of fluid from a third chamber to the pressure in which said flexible diaphragms are also responsive, said passages also providing communication of said last mentioned pressure to the side of said one diaphragm opposite to said first orifice, and means supplying fluid to the third chamber.

7. Apparatus of the type described comprising a stack of rigid elements assembled with diaphragms interposed between adjacent elements, said elements being provided with chambers closed by at least some of said diaphragms, the last mentioned diaphragms being flexible, at least one of said elements being provided with a first orifice adjacent to one of said flexible diaphragms and controllable thereby, and said elements being provided with fluid passages interconnecting said chambers and orifice and providing external connections for fluid flow, the assembly providing connected flexible diaphragms responsive to the difference between a reference pressure and a variable pressure applied to first and second chambers and controlling a second orifice venting a third chamber to the pressure in which said flexible diaphragms are also responsive, means supplying fluid to the third chamber, and means controlling a substantially constant rate of flow of fluid through said second orifice and a substantially constant pressure drop across the said second orifice.

8. Apparatus of the type described comprising a stack of rigid elements assembled with diaphragms interposed between adjacent elements, said elements being provided with chambers closed by at least some of said diaphragms, the last mentioned diaphragms being flexible, at least one of said elements being provided with an orifice adjacent to one of said flexible diaphragms and controllable thereby, and said elements being provided with fluid passages interconnecting said chambers and orifice and providing external connections for fluid flow, one of said diaphragms being subject to electromagnetic control to control in turn continuously variable flow through an orifice associated with the diaphragm.

9. Apparatus of the type described comprising a stack of rigid elements assembled with diaphragms interposed between adjacent elements, said elements being provided with chambers closed by at least some of said diaphragms, the last mentioned diaphragms being flexible, said diaphragms being arranged in operative units, each unit being associated with an orifice in one of said elements, each of said orifices being controlled by its associated diaphragm unit, said units including a control valve unit for controlling a fluid flow, a measurement and transmission unit responsive to pressure across said control valve unit, and a constant flow and pressure pilot unit and a controller unit responsive to pressure received from said measurement and transmission unit and external control pressure to position the control valve unit to control the flow of liquid therethrough, and said elements being provided with fluid passages interconnecting said chambers and orifices and providing external connections for fluid flow.

10. Apparatus of the class described, comprising means defining a first chamber, means providing an orifice leading out of said chamber, diaphragm means controlling the bleed rate of fluid through said orifice and subject to force from pressure in said chamber, means defining a second chamber, said diaphragm means being subject to force from pressure in said second chamber whereby the diaphragm means is positioned as a result of opposing forces, electromagnetic means for modifying the position of said diaphragm means, and means for supplying fluid pressure to the respective chambers.

References Cited in the file of this patent

UNITED STATES PATENTS

| 2,286,282 | Joesting | June 16, 1942 |
| 2,401,144 | Dube | May 28, 1946 |
| 2,407,761 | McPherson | Sept. 17, 1946 |
| 2,461,772 | Ray | Feb. 15, 1949 |
| 2,516,333 | Moore | July 25, 1950 |
| 2,517,051 | Swenson | Aug. 1, 1950 |
| 2,566,019 | Dempsey | Aug. 28, 1951 |
| 2,584,455 | Hughes | Feb. 5, 1952 |

OTHER REFERENCES

Moore Products Co. (Philadelphia, Pa.) Instructions 505-S for Nullmatic Controller Models 50 and 55, 1947-48, pp. 2-7, 16 and 20.